United States Patent
Kim et al.

(10) Patent No.: US 9,495,916 B2
(45) Date of Patent: Nov. 15, 2016

(54) METHOD OF DISPLAYING THREE-DIMENSIONAL STEREOSCOPIC IMAGE AND DISPLAY APPARATUS FOR PERFORMING THE METHOD

(75) Inventors: Heen-Dol Kim, Yongin-si (KR); Bong-Hyun You, Yongin-si (KR); Jai-Hyun Koh, Seoul (KR); Kuk-Hwan Ahn, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 909 days.

(21) Appl. No.: 13/348,770

(22) Filed: Jan. 12, 2012

(65) Prior Publication Data

US 2012/0299907 A1 Nov. 29, 2012

(30) Foreign Application Priority Data

May 23, 2011 (KR) .................. 10-2011-0048297

(51) Int. Cl.
G09G 3/34 (2006.01)
H04N 13/00 (2006.01)
H04N 13/04 (2006.01)
G09G 3/36 (2006.01)
G09G 3/00 (2006.01)
G09G 3/20 (2006.01)

(52) U.S. Cl.
CPC .......... *G09G 3/3413* (2013.01); *G09G 3/3607* (2013.01); *H04N 13/0037* (2013.01); *H04N 13/0422* (2013.01); *H04N 13/0452* (2013.01); *H04N 13/0497* (2013.01); *G09G 3/003* (2013.01); *G09G 3/2003* (2013.01); *G09G 3/3426* (2013.01); *G09G 2310/0245* (2013.01); *G09G 2320/0209* (2013.01); *G09G 2320/064* (2013.01); *G09G 2320/0613* (2013.01); *G09G 2320/0646* (2013.01); *G09G 2340/0435* (2013.01); *G09G 2360/16* (2013.01); *H04N 13/0438* (2013.01)

(58) Field of Classification Search
CPC .............................................. G09G 2310/0235
See application file for complete search history.

(56) References Cited

U.S. PATENT DOCUMENTS

| 6,034,666 A | * | 3/2000 | Kanai | .............. G09G 1/04 345/593 |
|---|---|---|---|---|
| 2005/0141217 A1 | * | 6/2005 | Kim | ......................... 362/225 |
| 2007/0242090 A1 | * | 10/2007 | Struyk | ........................ 345/690 |
| 2011/0063330 A1 | * | 3/2011 | Bae et al. | ..................... 345/690 |
| 2012/0223973 A1 | * | 9/2012 | Uehara | ........................ 345/690 |

OTHER PUBLICATIONS

Liu, Yi-Hua, Zong-Zhen Yang, and Shun-Chung Wang. "A novel sequential-color RGB-LED backlight driving system with local dimming control and dynamic bus voltage regulation." Consumer Electronics, IEEE Transactions on 56.4 (2010): 2445-2452.*

Shiga, T., and S. Mikoshiba. "49.2: Reduction of LCTV Backlight Power and Enhancement of Gray Scale Capability by Using an Adaptive Dimming Technique." SID Symposium Digest of Technical Papers. vol. 34. No. 1. Blackwell Publishing Ltd, 2003.*

* cited by examiner

*Primary Examiner* — Zhengxi Liu

(74) *Attorney, Agent, or Firm* — Cantor Colburn LLP

(57) ABSTRACT

A method of displaying a three-dimensional stereoscopic image includes generating a plurality of left-eye or right-eye virtual primary color data using a left-eye or right-eye data frame, calculating a plurality of left-eye or right-eye virtual primary color dimming levels using the left-eye or right-eye virtual primary color data, sequentially outputting a plurality of left-eye or right-eye virtual primary color data frames, corrected based on the left-eye or right-eye virtual primary color dimming levels, to a display panel, and sequentially providing a plurality of left-eye or right-eye virtual primary color lights, generated from a light source part based on the left-eye or right-eye virtual primary color dimming levels, to the display panel.

16 Claims, 11 Drawing Sheets

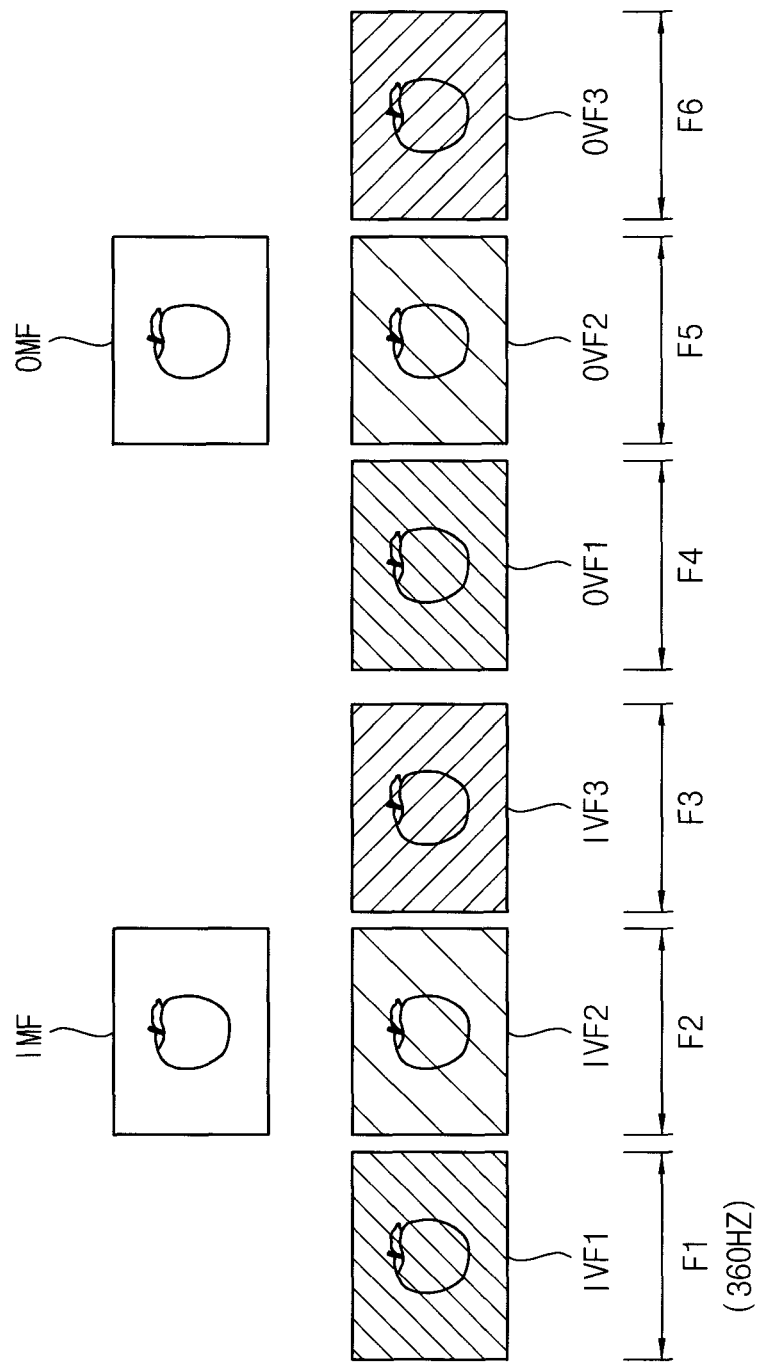

METHOD OF DISPLAYING THREE-DIMENSIONAL STEREOSCOPIC IMAGE AND DISPLAY APPARATUS FOR PERFORMING THE METHOD

This application claims priority to Korean Patent Application No. 2011-0048297, filed on May 23, 2011, and all the benefits accruing therefrom under 35 U.S.C. §119, the content of which in its entirety is herein incorporated by reference.

BACKGROUND OF THE INVENTION

1. Field of the Invention

Exemplary embodiments of the invention relate to a method of displaying a three-dimensional ("3D") stereoscopic image and a display apparatus for performing the method of displaying the 3D stereoscopic image. More particularly, exemplary embodiments of the invention relate to a method of displaying a 3D stereoscopic image with improved display quality and a display apparatus for performing the method.

2. Description of the Related Art

Generally, a liquid crystal display ("LCD") apparatus includes an LCD panel that displays an image using a transmittance of a liquid crystal ("LC") and a backlight unit disposed under the LCD panel to provide light to the LCD panel.

The 3D image display device displays the 3D image using a principle of binocular parallax through two eyes of human. For example, since two eyes of human are spaced apart from each other, images viewed at the different angles are inputted to the brain of human. Thus, the observer may watch the 3D image to recognize the stereoscopic image through the display device.

The stereoscopic image display device is classified into a stereoscopic type with an extra spectacle and an autostereoscopic type without the extra spectacle. The stereoscopic type includes a passive polarized-glasses method with a polarized filter having a different polarized axis corresponding to two eyes, respectively, and an active shutter-glasses method. In the active shutter-glasses method, a left-eye image and a right-eye image are temporally divided to be periodically displayed, and a viewer wears a pair of glasses which sequentially open or close a left-eye shutter and a right-eye shutter synchronized with the displaying periods of the left and right eye images.

The LCD that displays the 3D image has been an active field of research as demand for the 3D image has increased in the industrial field such as games and movies, for example.

BRIEF SUMMARY OF THE INVENTION

Exemplary embodiments of the invention provide a method of driving a display panel with improved display quality of a three dimensional ("3D") stereoscopic image.

Exemplary embodiments of the invention also provide a display apparatus for performing the method of driving the display panel.

According to an exemplary embodiment of the invention, a method of displaying a 3D stereoscopic image includes generating a plurality of left-eye virtual primary color data or a plurality of right-eye virtual primary color data using a left-eye data frame or a right-eye data frame, calculating a plurality of left-eye virtual primary color dimming levels or a plurality of right-eye virtual primary color dimming levels using the left-eye virtual primary color data or the right-eye virtual primary color data, sequentially outputting a plurality of left-eye virtual primary color data frames or a plurality of right-eye virtual primary color data frames, corrected based on the left-eye virtual primary color dimming levels or the right-eye virtual primary color dimming levels, to a display panel, and sequentially providing a plurality of left-eye virtual primary color lights or a plurality of right-eye virtual primary color lights, generated from a light source part based on the left-eye virtual primary color dimming levels or the right-eye virtual primary color dimming levels, to the display panel.

In an exemplary embodiment, the light source part may include a plurality of light-emitting blocks which is driven independent of each other, and the left-eye virtual primary color data or the right-eye virtual primary color data may be generated corresponding to each of the light-emitting blocks.

In an exemplary embodiment, the generating the left-eye virtual primary color data or the right-eye virtual primary color data may include detecting a color distribution using the left-eye frame or the right-eye data frame, and calculating the left-eye virtual primary color data or the right-eye virtual primary color data based on the color distribution.

In an exemplary embodiment, the left-eye virtual primary color data or the right-eye virtual primary color data may include reddish color data, greenish color data and bluish color data.

In an exemplary embodiment, the outputting the left-eye virtual primary color data frames or the right-eye virtual primary color data frames may include calculating a plurality of correction coefficients using the left-eye virtual primary color dimming levels or the right-eye virtual primary color dimming levels, and correcting the left-eye data frame or the right-eye data frame using the correction coefficients.

In an exemplary embodiment, the method may further include mapping color data included in the left-eye data frame or the right-eye data frame into red, green, blue and at least one primary color data, and generating the left-eye virtual primary color data or the right-eye virtual primary color data based on the mapped left-eye data frame or the mapped right-eye data frame, where a unit pixel of the display panel comprises a red subpixel, a green subpixel, a blue subpixel and at least one primary color subpixel.

In an exemplary embodiment, the sequentially outputting the left-eye virtual primary color data frames or the right-eye virtual primary color data frames may include correcting the mapped left-eye data frame or the mapped right-eye data frame using the correction coefficients.

In an exemplary embodiment, the method may further include displaying a black image on the display panel, after the sequentially outputting the left-eye virtual primary color data frames or the right-eye virtual primary color data frames to the display panel.

In an exemplary embodiment, the displaying the black image on the display panel includes outputting black data corresponding to the black image to the display panel, and turning off the light source part such that light generated therefrom is blocked from reaching the display panel.

In an exemplary embodiment, the displaying the black image on the display panel may include outputting black data corresponding to the black image to the display panel.

In an exemplary embodiment, the displaying the black image on the display panel may include turning off the light source part such that light generated therefrom is blocked from reaching the display panel.

According to another exemplary embodiment of the invention, a display apparatus includes a virtual primary decision part which generates a plurality of left-eye virtual primary color data or a plurality of right-eye virtual primary color data using a left-eye data frame or a right-eye data frame, a dimming level decision part which calculates a plurality of left-eye virtual primary dimming levels or a plurality of right-eye virtual primary dimming levels using the left-eye virtual primary color data or the right-eye virtual primary color data, a data processing part which sequentially outputs a plurality of left-eye virtual primary color data frames or a plurality of right-eye virtual primary color data frames corrected based on the left-eye virtual primary color dimming levels or the right-eye virtual primary color dimming levels, a display panel which displays a plurality of left-eye virtual primary color images or a plurality of right-eye virtual primary color images respectively corresponding to the left-eye virtual primary color data frames or the right-eye virtual primary color data frames, and a light source part which generates a plurality of left-eye virtual primary color lights or a plurality of right-eye virtual primary color lights based on the left-eye virtual primary color dimming levels or the right-eye virtual primary color dimming levels, and sequentially provides the left-eye virtual primary color lights or the right-eye primary color lights to the display panel.

In an exemplary embodiment, the left-eye virtual primary color data or the right-eye virtual primary color data may include reddish color data, greenish color data and bluish color data.

In an exemplary embodiment, the light source part may include a plurality of light-emitting blocks which is driven independent of each other, and the virtual primary decision part may generate the left-eye virtual primary color data or the right-eye virtual primary color data corresponding to each of the light-emitting blocks.

In an exemplary embodiment, the virtual primary decision part may include a color distribution detection part which detects a color distribution using the left-eye data frame or the right-eye data frame, and a virtual primary calculation part which calculates the left-eye virtual primary color data or the right-eye virtual primary color data based on the color distribution.

In an exemplary embodiment, the dimming level decision part may include a coefficient calculation part which calculates a plurality of correction coefficients using the left-eye virtual primary color dimming levels or the right-eye virtual primary color dimming levels, and the data processing part may include a correction part which corrects the left-eye data frame or the right-eye data frame using the correction coefficients.

In an exemplary embodiment, a unit pixel of the display panel includes red, green, blue and at least one primary color sub pixels, the data processing part may include a color gamut mapping part which maps color data including the left-eye data frame or the right-eye data frame into red, green, blue and at least one primary color data, and the virtual primary decision part may generate the left-eye virtual primary color data or the right-eye virtual primary color data based on the mapped left-eye data frame or the mapped right-eye data frame.

In an exemplary embodiment, the correction part may correct the mapped left-eye data frame or the mapped right-eye data frame using the correction coefficients.

In an exemplary embodiment, the display apparatus may further include a black insertion part which displays a black image on the display panel, after the left-eye virtual primary color data frames or the right-eye virtual primary color data frames are sequentially outputted to the display panel.

In an exemplary embodiment, the display apparatus may further include a panel driving part which drives the display panel, and a light source driving part which drives the light source part, where the black insertion part may control at least one of the panel driving part and the light source driving part such that the black image is displayed on the display panel.

According to exemplary embodiments of the invention, a 3D stereoscopic image may be displayed using a field sequential color ("FSC") driving mode, in which a plurality of virtual primary color lights is driven such that the color break-up is effectively prevented.

BRIEF DESCRIPTION OF THE DRAWINGS

The above and other features of the invention will become more apparent by describing in detailed exemplary embodiments thereof with reference to the accompanying drawings, in which:

FIGS. 6A and 6B are schematic diagrams illustrating an exemplary embodiment of virtual primary color data frames outputted from the data processing part of FIG. 2;

DETAILED DESCRIPTION OF THE INVENTION

Figure 1:
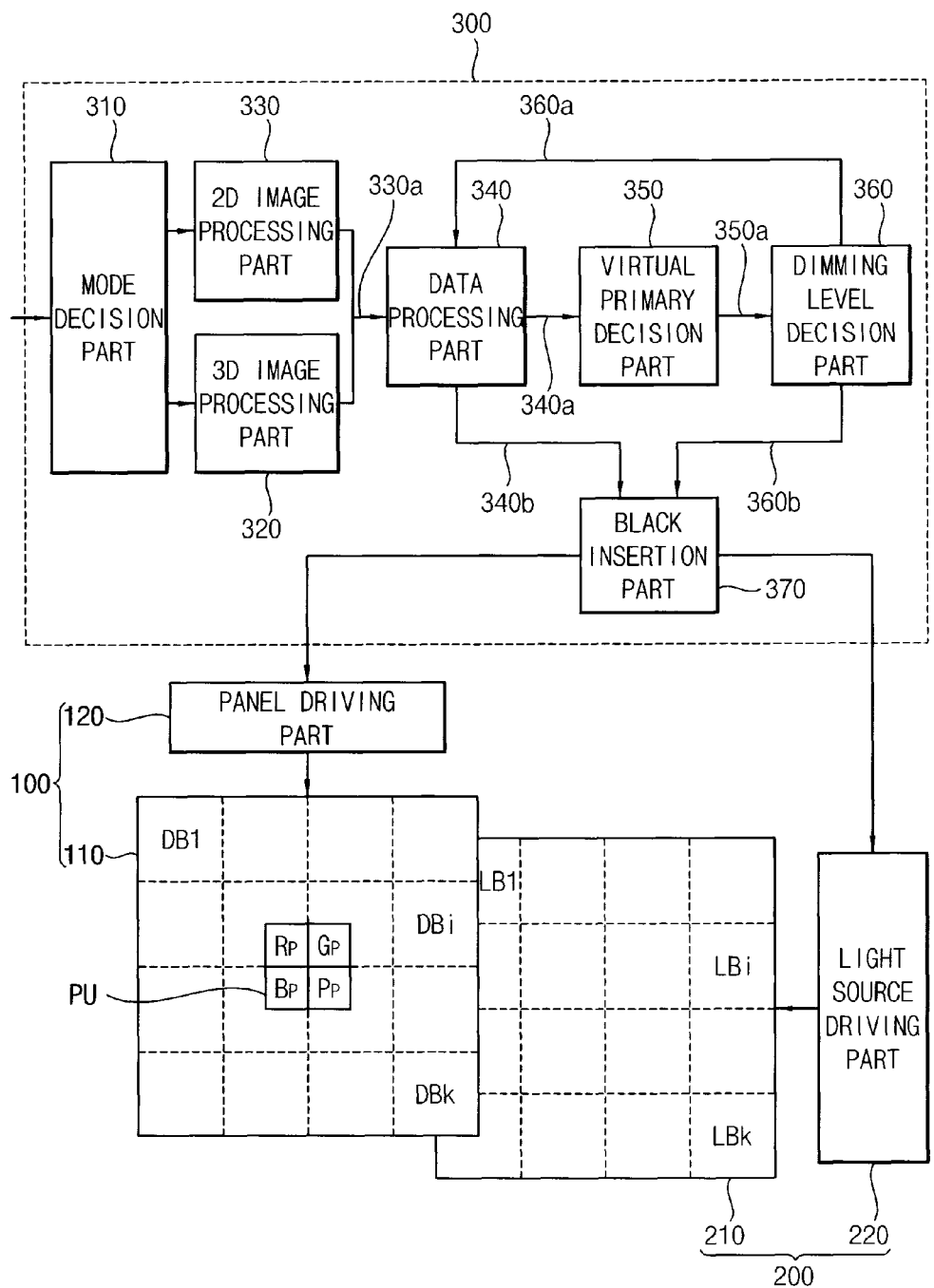
FIG. 1 is a block diagram illustrating an exemplary embodiment of a display apparatus according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

FIG. 1 is a block diagram illustrating an exemplary embodiment of a display apparatus according to the invention.

Referring to FIG. 1, the display apparatus includes a panel module 100, a light source module 200 and a data processing module 300.

The panel module 100 includes a display panel 110 and a panel driving part 120. The display panel 110 includes a plurality of unit pixels, and each of the unit pixels PU may include red, green, blue and at least one primary color sub pixels Rp, Gp, Bp and Pp. The primary color Pp may include at least one of cyan, magenta, yellow and white, for example. The panel driving part 120 may include a timing control part, a data driving part and a gate driving part, for example (not shown).

The light source module 200 includes a light source part 210 and a light source driving part 220. The light source part 210 may include a plurality of color light sources. In an exemplary embodiment, the color light sources may include a red light source, a green light source and a blue light source, for example, but not being limited thereto. In an alternative exemplary embodiment, the color light sources may further include an emerald light source, for example. The light source part 210 includes at least one light-emitting block that is individually driven or driven independent of each other. In an exemplary embodiment, the light source part 210 includes a plurality of light-emitting blocks arranged in one-dimensional structure along one of a vertical direction and a horizontal direction, for example. In an alternative exemplary embodiment, as shown in FIG. 1, the light source part 210 may include a plurality of light-emitting blocks LB1, . . . , LBi, . . . , LBk arranged in two-dimensional structure along the vertical direction and the horizontal direction, for example. The light source driving part 220 drives the light source part 210. The light source driving part 220 controls each of the light-emitting blocks LB1, . . . , LBi, . . . , LBk of the light source part 210 such that the light-emitting blocks LB1, . . . , LBi, . . . , LBk are driven independent of each other in a local dimming mode. Each of the light-emitting blocks may include a plurality of color light sources (i is a natural number, and k is a natural number greater than i).

The data processing module or a data processor 300 includes a mode decision part 310, a three-dimensional ("3D") image processing part 320, a two-dimensional ("2D") image processing part 330, a data processing part 340, a virtual primary decision part 350, a dimming level decision part 360 and a black insertion part 370.

The mode decision part 310 decides whether an image signal is a 2D signal or a 3D signal, and provides the image signal to the 3D image processing part 320 or the 2D image processing part 330.

In the 3D image mode, the 3D image processing part 320 receives a 3D original image frame, divides the 3D original image frame into a left-eye data frame and a right-eye data frame, and sequentially outputs the left-eye data frame and the right-eye data frame. In one exemplary embodiment, for example, the 3D image processing part 320 divides the 3D original image frame into left-eye data and right-eye data, scales each of the left-eye and right-eye data into a resolution of the display panel 110 to generate a left-eye data frame and a right-eye data frame, and sequentially outputs the left-eye data frame and the right-eye data frame (330a).

In an exemplary embodiment, the 2D image processing part 330 receives a 2D original data frame and sequentially outputs an interpolation data frame and an original data frame (330a) in the 2D image mode. The interpolation data frame is a data frame interpolated between the 2D original data frame received during a current frame and the 2D original data frame received during a previous frame using a Motion Estimation Motion Compensation ("MEMC") algorithm. In an alternative exemplary embodiment, the 2D image processing part 320 may repeat the 2D original data frame to sequentially output a first original data frame and a second original data frame.

The data processing part 340 receives red, green and blue data of the data frame outputted from the 2D image processing part 330 or the 3D image processing part 320 based on the image mode. The data processing part 340 maps the received red, green and blue data into red, green, blue and at least one primary color data corresponding to the sub pixels of the display panel 110. The data processing part 340 outputs the mapped data frame to the virtual primary decision part 350 (340a).

In an exemplary embodiment, the data processing part 340 corrects color data of the data frame using a correction coefficient corresponding to each of the sub pixels received from the dimming level decision part 360.

The virtual primary decision part 350 decides a plurality of virtual primary colors respectively corresponding to block images displayed on the display blocks based on the data frame. The plurality of virtual primary colors may include a first virtual primary color such as a reddish color, a second virtual primary color such as a greenish color and a third virtual primary color such as a bluish color. The virtual primary decision part 350 outputs data of the first, second and third virtual primary colors decided respectively corresponding to the block images on the display blocks to the dimming level decision part 360 (350a).

The dimming level decision part 360 decides a first virtual primary color dimming level, a second virtual primary dimming level and a third virtual primary color dimming level of each of the light-emitting blocks using the data of the first, second and third virtual primary colors. The dimming level decision part 360 provides the first, second and third virtual primary color dimming levels to the black insertion part 370 or the light source driving part 220. The first virtual primary color dimming level is a dimming level which drives the light-emitting block to emit a first virtual primary color light, such as a reddish light, the second virtual primary color dimming level is a dimming level which drives the light-emitting block to emit a second virtual primary color light, such as a greenish light, and the third virtual primary color dimming level is a dimming level which drives the light-emitting block to emit a third virtual primary color light, such as a bluish light.

In an exemplary embodiment, the dimming level decision part 360 analyses a luminance distribution of the first virtual primary color light emitted from the light-emitting blocks LB1, ..., LBi, ..., LBk based on the first virtual primary color dimming levels respectively corresponding to the light-emitting blocks LB1, ..., LBi, ..., LBk. The dimming level decision part 360 calculates a first correction coefficient to correct a pixel luminance corresponding to each of the sub pixels based on the luminance distribution of the first virtual primary color light. Similarly, the dimming level decision part 360 calculates a second correction coefficient and a third correction coefficient. The dimming level decision part 360 provides the first, second and third correction coefficients to the data processing part 340 on a field-by-field basis (360a).

In such an embodiment, the data processing part 340 corrects the data frame using the first correction coefficient during a first field to output a first virtual primary color data frame, corrects the data frame using the second correction coefficient during a second field to output a second virtual primary color data frame, and corrects the data frame using the third correction coefficient during a third field to output a third virtual primary color data frame (340b).

The black insertion part 370 may control at least one of the panel driving part 120 and the light source driving part 220 such that a black image is inserted between a left-eye image and a right-eye image to prevent a crosstalk in the 3D image mode. In an exemplary embodiment, the black insertion part 370 controls the panel driving part 120 such that the panel driving part 120 outputs black data to the display panel 110 to display the black image. In an alternative exemplary embodiment, the black insertion part 370 controls the light source driving part 220 such that the light source driving part 220 turns off the light source part 210 to display the black image. In an alternative exemplary embodiment, the black insertion part 370 controls both the panel driving part 120 and the light source driving part 220 such that the panel driving part 120 outputs the black data to the display panel 110 and the light source driving part 220 turns off the light source part 210, to display the black image.

In one exemplary embodiment, for example, the black insertion part 370 provides the first, second and third left-eye virtual primary color data frames received from the data processing part 340 to the panel driving part 120 during three consecutive fields, and provides first, second and third left-eye virtual primary color dimming levels to the light source driving part 220 received from the dimming level decision part 360 during the three consecutive fields. In such an embodiment, the display panel 110 displays first, second and third left-eye virtual primary color images, and the light source part 210 emits first, second and third left-eye virtual primary color lights in synchronization with the images displayed on the display panel 110. Then, the black insertion part 370 controls at least one of the panel driving part 120 and the light source driving part 220 during a subsequent field, e.g., during one field after the three consecutive fields, such that at least one of the display panel 110 and the light source part 210 displays the black image. Therefore, the display apparatus displays the left-eye image during the three consecutive fields and displays the black image during the one field.

In an alternative exemplary embodiment, the black insertion part 370 provides the first, second and third right-eye virtual primary color data frames received from the data processing part 340 to the panel driving part 120 during three consecutive fields, and provides first, second and third right-eye virtual primary color dimming levels to the light source driving part 220 received from the dimming level decision part 360. In such an embodiment, the display panel 110 displays first, second and third right-eye virtual primary color images, and the light source part 210 emits first, second and third right-eye virtual primary color lights in synchronization with the images displayed on the display panel 110. Then, the black insertion part 370 controls at least one of the panel driving part 120 and the light source driving part 220 during a subsequent field such that at least one of the display panel 110 and the light source part 210 displays the black image. Therefore, the display apparatus displays the right-eye image during the three consecutive fields and displays the black image during the subsequent field.

However, the black insertion part 370 may not substantially operate in the 2D image mode. In an exemplary embodiment, the black insertion part 370 bypasses the data frame received from the data processing part 340 to the panel driving part 120, and bypasses the virtual primary color dimming levels received from the dimming level decision part 360 to the light source driving part 220.

In an exemplary embodiment, the black insertion part 370 provides first, second and third interpolation virtual primary color data frames received from the data processing part 340 to the panel driving part 120 during three consecutive fields, and provides first, second and third interpolation virtual primary color dimming levels received from the dimming level decision part 360 to the light source driving part 220 during the three consecutive fields. In such an embodiment, the display panel 110 displays first, second and third interpolation virtual primary color images and the light source part 210 emits first, second and third interpolation virtual primary color lights in synchronization with the images displayed on the display panel 110. The display apparatus displays the interpolation images during the three consecutive fields.

In an alternative exemplary embodiment, the black insertion part 370 provides first, second and third original virtual primary color data frames received from the data processing part 340 to the panel driving part 120 during three consecutive fields, and provides first, second and third original virtual primary color dimming levels received from the dimming level decision part 360 to the light source driving part 220 during the three consecutive fields. In such an embodiment, the display panel 110 displays first, second and third original virtual primary color images and the light source part 210 emits first, second and third original virtual primary color lights in synchronization with the images displayed on the display panel 110. The display apparatus displays the original images during the three consecutive fields.

Figure 2:
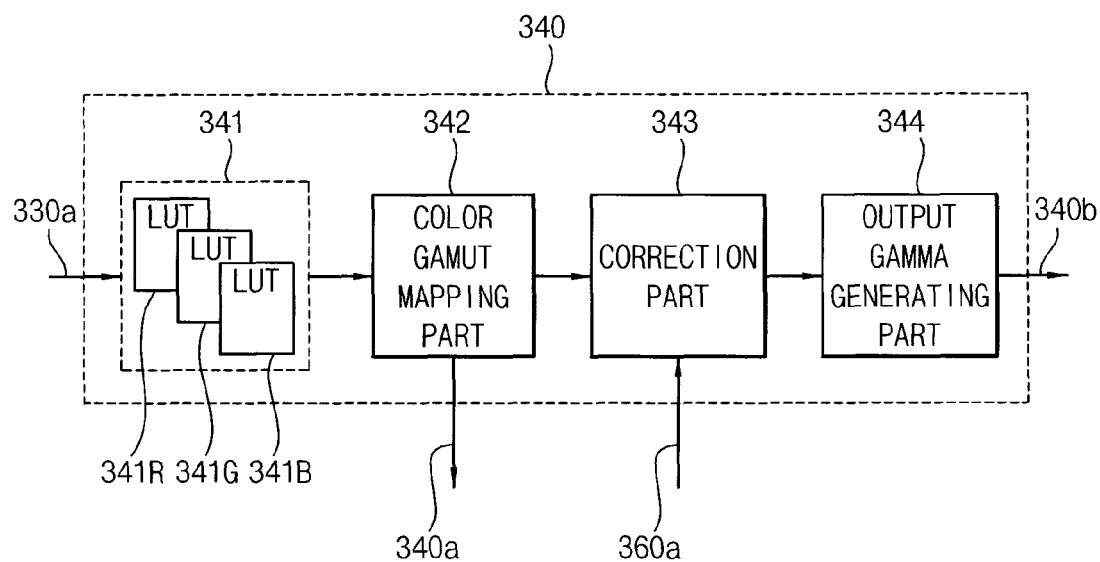
FIG. 2 is a block diagram illustrating an exemplary embodiment of a data processing part of FIG. 1.

FIG. 2 is a block diagram illustrating an exemplary embodiment of a data processing part of FIG. 1.

Referring to FIG. 2, the data processing part 340 includes an input gamma generating part 341, a color gamut mapping part 342, a correction part 343 and an output gamma generating part 344.

The input gamma generating part 341 includes a red look up table ("LUT") 341R, a green LUT 341G and a blue LUT 341B, and extends bits of the color data included in the data frame to output the color data having the extended bits. In an exemplary embodiment, the input gamma generating part 341 extends received red data of n bits, received green data of n bits and received blue data of n bits using the red, green and blue LUTs 341R, 341G and 341B to output the red data of m bits, the green data of m bits and the blue data of m bits (n is a natural number, and m is a natural number greater than n). In an exemplary embodiment, the input gamma generating part 341 outputs the red data of m bits, the green data of m bits and the blue data of m bits based on a nonlinear gamma curve.

The color gamut mapping part 342 maps red, green and blue data of m bits into red, green, blue and at least one primary color data of m bits. The color gamut mapping part 342 provides the mapped color data of the data frame to the virtual primary decision part 350 (340a).

The correction part 343 corrects the data frame based on a first correction coefficients 360a received from the dimming level decision part 360 to output a first virtual primary color data frame, corrects the data frame based on a second correction coefficients 360a received from the dimming level decision part 360 to output a second virtual primary color data frame, and corrects the data frame based on a third correction coefficients 360a received from the dimming level decision part 360 to output a third virtual primary color data frame. The correction part 343 sequentially outputs the first, second and third virtual primary color data frames on a field-by-field basis.

The output gamma generating part 344 reduces bits of the color data included in the first, second and third virtual primary color data frames. In one exemplary embodiment, for example, the red, green, blue and at least one primary color data of m bits are reduced into the red, green, blue and at least one primary color data of n bits (340b). In an exemplary embodiment, the output gamma generating part 344 outputs the red, green, blue and at least one primary color data of n bits based on a linear gamma curve.

Figure 3:
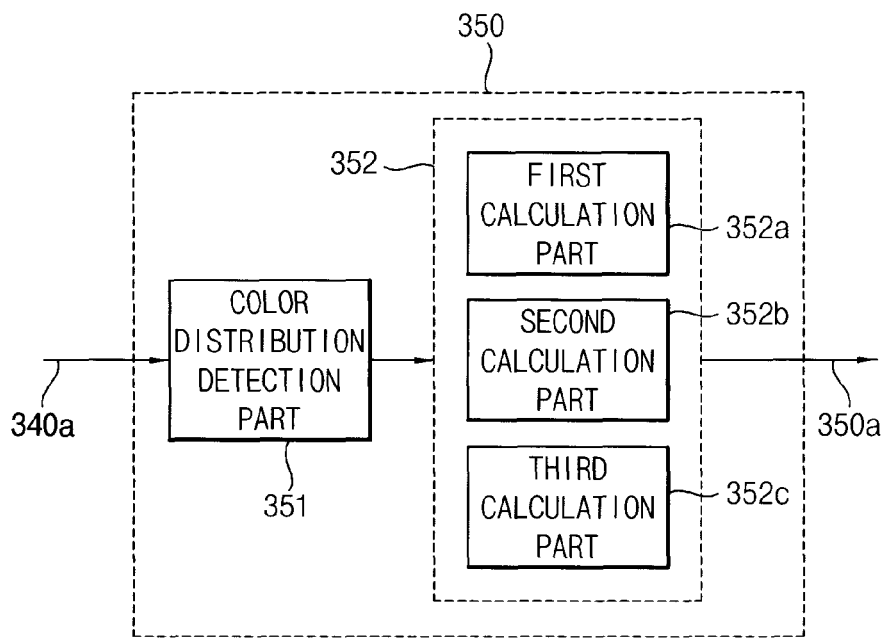
FIG. 3 is a block diagram illustrating an exemplary embodiment of a virtual primary decision part of FIG. 1.
Figure 4:
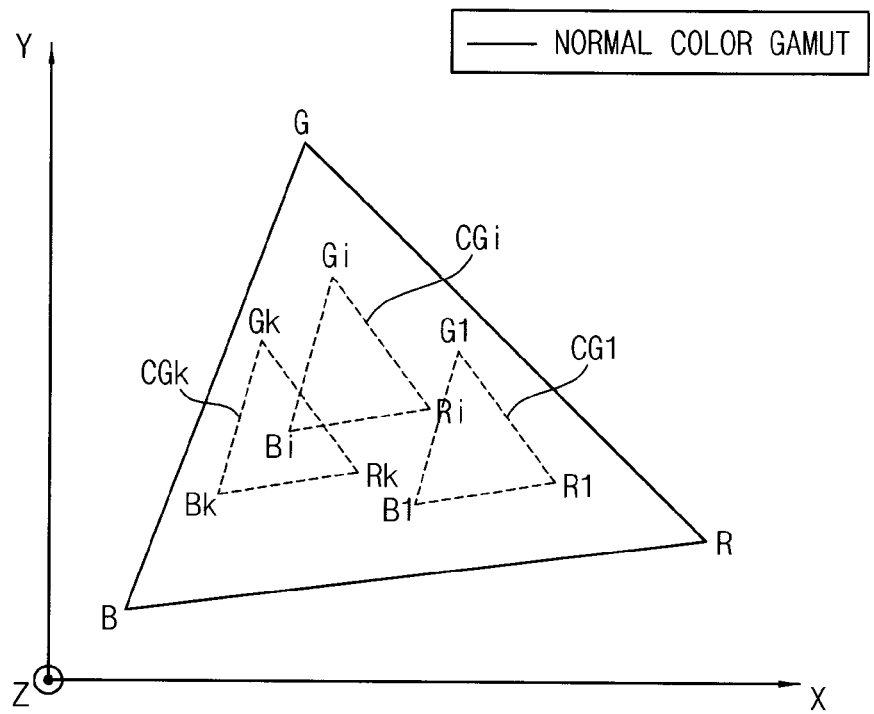
FIG. 4 is a schematic diagram illustrating an exemplary embodiment of a method of generating virtual primary color data in the virtual primary decision part of FIG. 3.

FIG. 3 is a block diagram illustrating an exemplary embodiment of a virtual primary decision part shown in FIG. 1. FIG. 4 is a schematic diagram illustrating an exemplary embodiment of a method of generating virtual primary color data in the virtual primary decision part of FIG. 3.

Referring to FIGS. 1, 3 and 4, the virtual primary decision part 350 includes a color distribution detection part 351 and a virtual primary calculation part 352.

The color distribution detection part 351 detects a color distribution corresponding to each of the display blocks using the data frame.

The virtual primary calculation part 352 includes a first calculation part 352a, a second calculation part 352b and a third calculation part 353c, and calculates a plurality of virtual primary color data corresponding to each of the display blocks using the color distribution. The first calculation part 352a calculates a first virtual primary color data based on the color distribution, the second calculation part 352b calculates a second virtual primary color data based on the color distribution, and the third calculation part 352c calculates a third virtual primary color data based on the color distribution. In one exemplary embodiment, for example, the first virtual primary color may be a reddish color, the second virtual primary color may be a greenish color and the third virtual primary color may be a bluish color.

The virtual primary calculation part 352 may calculates the first, second and third virtual primary color data corresponding to each of the display blocks.

In one exemplary embodiment, for example, referring to FIGS. 1 and 4, the color distribution detection part 351 detects a first color distribution CG1 based on the color data of the sub pixels included in a first display block DB1 of the display panel 110. The virtual primary calculation part 352 calculates first virtual primary color data R1, second virtual primary color data G1 and third virtual primary color data B1 of the first display block DB1 based on the first color distribution CG1. Similarly, the color distribution detection part 351 detects an i-th color distribution CGi based on the color data of the sub pixels included in an i-th display block DBi of the display panel 110, and the virtual primary calculation part 352 calculates a first virtual primary color data Ri, second virtual primary color data Gi and third virtual primary color data Bi of the i-th display block DBi based on the i-th color distribution CGi. Similarly, the color distribution detection part 351 detects a k-th color distribution CGk based on the color data of the sub pixels included in a k-th display block DBk of the display panel 110, and the virtual primary calculation part 352 calculates first virtual primary color data Rk, second virtual primary color data Gk and third virtual primary color data Bk of the k-th display block DBk based on the k-th color distribution CGk.

Figure 5:
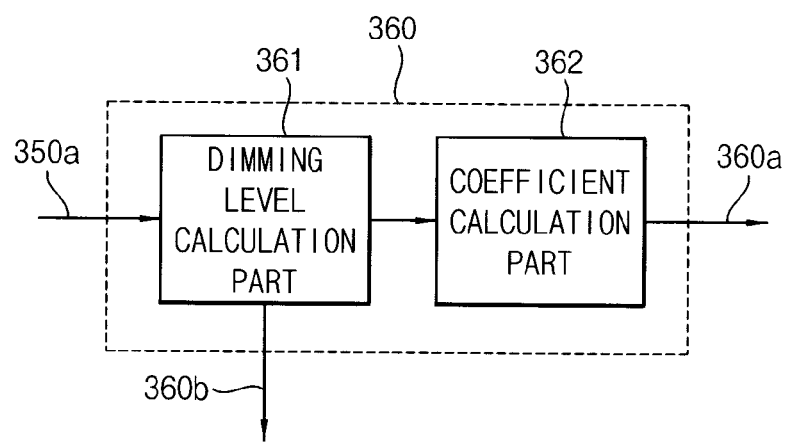
FIG. 5 is a block diagram illustrating an exemplary embodiment of a dimming level decision part of FIG. 1.

FIG. 5 is a block diagram illustrating an exemplary embodiment of a dimming level decision part of FIG. 1.

Referring to FIGS. 1, 3 and 5, the dimming level decision part 360 includes a dimming level calculation part 361 and a coefficient calculation part 362.

The dimming level calculation part 361 calculates first, second and third virtual primary color dimming levels corresponding to each of the display blocks using the first, second and third virtual primary color data received from the virtual primary decision part 350. Each of the first, second and third virtual primary color dimming levels includes dimming levels corresponding to the color light sources included in the light-emitting block.

The first virtual primary color dimming level may be a dimming level which drives the light-emitting block to emit the first virtual primary color light, such as the reddish light, the second virtual primary color dimming level may be a dimming level which drives the light-emitting block to emit the second virtual primary color light, such as the greenish light, and the third virtual primary color dimming level may be a dimming level which drives the light-emitting block to emit the third virtual primary color light, such as the bluish light.

The first, second and third virtual primary color dimming levels, corresponding to each of the light-emitting blocks and calculated from the dimming level calculation part 361, are provided to the light source driving part 220 through the black insertion part 370 (360b).

In an exemplary embodiment, the coefficient calculation part 362 analyses a luminance distribution of the first virtual primary color light emitted from the light-emitting blocks LB1, ..., LBi, ..., LBk using the first virtual primary color dimming levels of the light-emitting blocks LB1, ..., LBi, ..., LBk calculated from the dimming level calculation part 361. The coefficient calculation part 362 calculates the first correction coefficient to correct the pixel luminance corresponding to each of the sub pixels based on the luminance distribution of the first virtual primary color light. The coefficient calculation part 362 provides the first correction coefficient to the data processing part 340 during the first field (360a).

In such an embodiment, the coefficient calculation part 362 analyses the luminance distribution of the second virtual primary color light emitted from the light-emitting blocks LB1, ..., LBi, ..., LBk using the second virtual primary color dimming levels of the light-emitting blocks LB1, ..., LBi, ..., LBk calculated from the dimming level calculation part 361. The coefficient calculation part 362 calculates the second correction coefficient to correct the pixel luminance corresponding to each of the sub pixels based on the luminance distribution of the second virtual primary color light. The coefficient calculation part 362 provides the second correction coefficient to the data processing part 340 during the first field (360a).

In such an embodiment, the coefficient calculation part 362 analyses the luminance distribution of the third virtual primary color light emitted from the light-emitting blocks LB1, ..., LBi, ..., LBk using the third virtual primary color dimming levels of the light-emitting blocks LB1, ..., LBi, ..., LBk calculated from the dimming level calculation part 361. The coefficient calculation part 362 calculates the third correction coefficient to correct the pixel luminance corresponding to each of the sub pixels based on the luminance distribution of the third virtual primary color light. The coefficient calculation part 362 provides the third correction coefficient to the data processing part 340 during the first field (360a).

The dimming level decision part 360 provides the first, second and third correction coefficients to the data processing part 340 during three consecutive fields (360a).

Figure 6A:
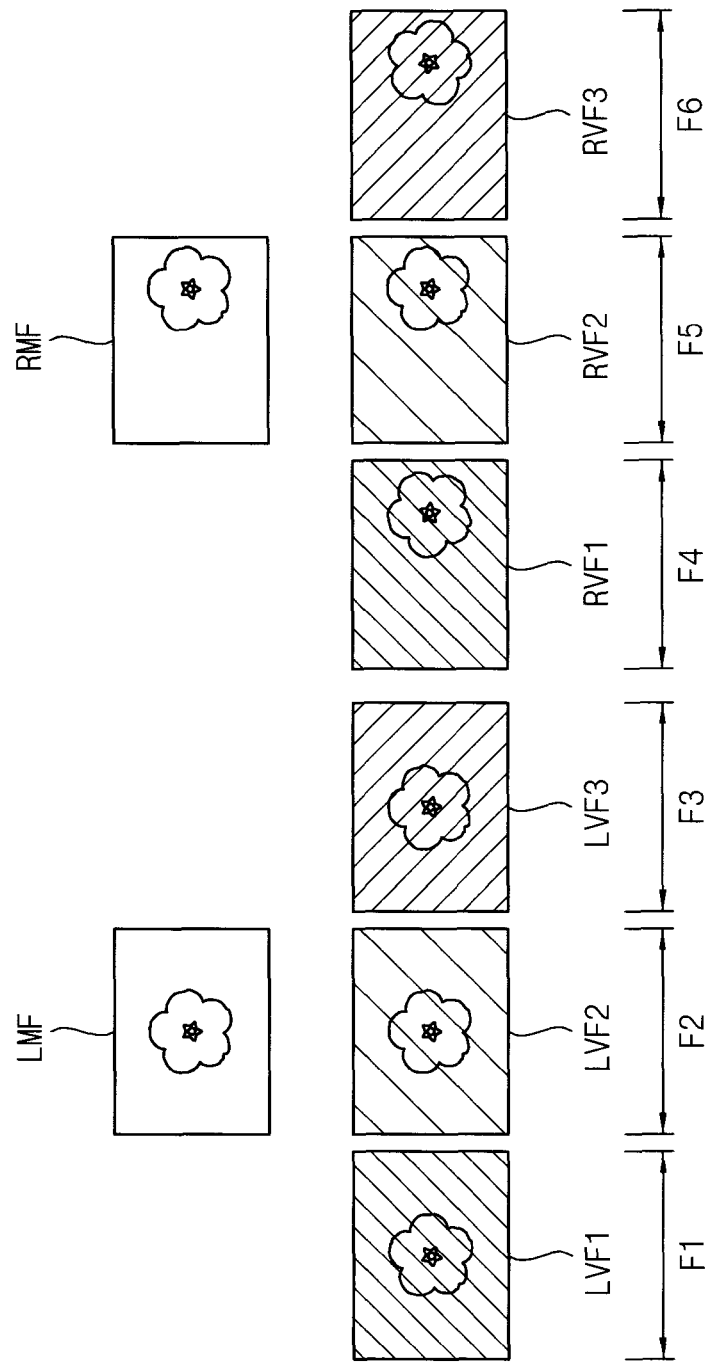

FIGS. 6A and 6B are schematic diagrams illustrating an exemplary embodiment of virtual primary color data frames outputted from the data processing part in FIG. 2.

Referring to FIGS. 2, 5 and 6A, in the 3D image mode, the data processing part sequentially outputs first, second and third left-eye virtual primary color data frames LVF1, LVF2 and LVF3 corresponding to the left-eye data frame LMF received during three consecutive fields, e.g., a first field F1, a second field F2 and a third field F3, and then, sequentially outputs first, second and third right-eye virtual primary color data frames RVF1, RVF2 and RVF3 corresponding to the right-eye data frame RMF received during subsequent three consecutive fields, e.g., a fourth field F4, a fifth field F5 and a sixth field F6.

In one exemplary embodiment, for example, the correction part 343 corrects the left-eye data frame LMF received from the color gamut mapping part 342 using the first left-eye correction coefficient received from the coefficient calculation part 362. The first left-eye correction coefficient may correspond to each color data included in the left-eye data frame. In one exemplary embodiment, for example, when the left-eye data frame includes (M×N) color data (M and N are natural numbers), the first correction coefficient includes (M×N) first correction coefficients corresponding to (M×N) color data, respectively.

The correction part 343 provides first left-eye virtual primary color data frame LVF1 corrected by the left-eye first correction coefficient to the output gamma generating part 344. The output gamma generating part 344 reduces bits of the color data included in the left-eye first virtual primary color data frame into original bits of the color data. Therefore, the data processing part 340 outputs the first left-eye virtual primary color data frame LVF1 during the first field F1.

In such an embodiment, the correction part 343 corrects the left-eye data frame LMF using the left-eye second correction coefficient to output the second left-eye virtual primary color data frame LVF2 during the second field F2, and corrects the left-eye data frame LMF using the left-eye third correction coefficient to output the third left-eye virtual primary color data frame LVF3 during the third field F3.

Then, the correction part 343 corrects the right-eye data frame RMF received from the color gamut mapping part 342 using the first, second and third right-eye correction coefficients received from the coefficient calculation part 362.

In such an embodiment, the correction part 343 corrects the right-eye data frame RMF using the first right-eye correction coefficient to output the first right-eye virtual primary color data frame RVF1 during the fourth field F4, corrects the right-eye data frame RMF using the second right-eye correction coefficient to output the second right-eye virtual primary color data frame RVF2 during the fifth field F5, and corrects the right-eye data frame RMF using the third right-eye correction coefficient to output the third right-eye virtual primary color data frame RVF3 during the sixth field F6.

Referring to FIGS. 2, 5 and 6B, in the 2D image mode, the data processing part sequentially outputs first, second and third interpolation virtual primary color data frames IVF1, IVF2 and IVF3 corresponding to the received interpolation data frame IMF during the three consecutive fields F1, F2 and F3, and sequentially outputs first, second and third original virtual primary color data frames OVF1, OVF2 and OVF3 corresponding to the original data frame OMF received during the subsequent three consecutive fields F4, F5 and F6.

Similarly to the 3D image mode described above, the correction part 343 corrects the interpolation data frame IMF using a first interpolation correction coefficient to output the first interpolation virtual primary color data frame IVF1 during the first field F1, corrects the interpolation data frame IMF using a second interpolation correction coefficient to output the second interpolation virtual primary color data frame IVF2 during the second field F2, and corrects the interpolation data frame IMF using a third interpolation correction coefficient to output the third interpolation virtual primary color data frame IVF3 during the third field F3. Then, the correction part 343 corrects the 2D original data frame OMF using a first original correction coefficient to output the first original virtual primary color data frame OVF1 during the fourth field F4, corrects the 2D original data frame OMF using a second original correction coefficient to output the second original virtual primary color data frame OVF2 during the fifth field F5, and corrects the 2D original data frame OMF using a third original correction coefficient to output the third original virtual primary color data frame OVF3 during the sixth field F6.

Figure 7:
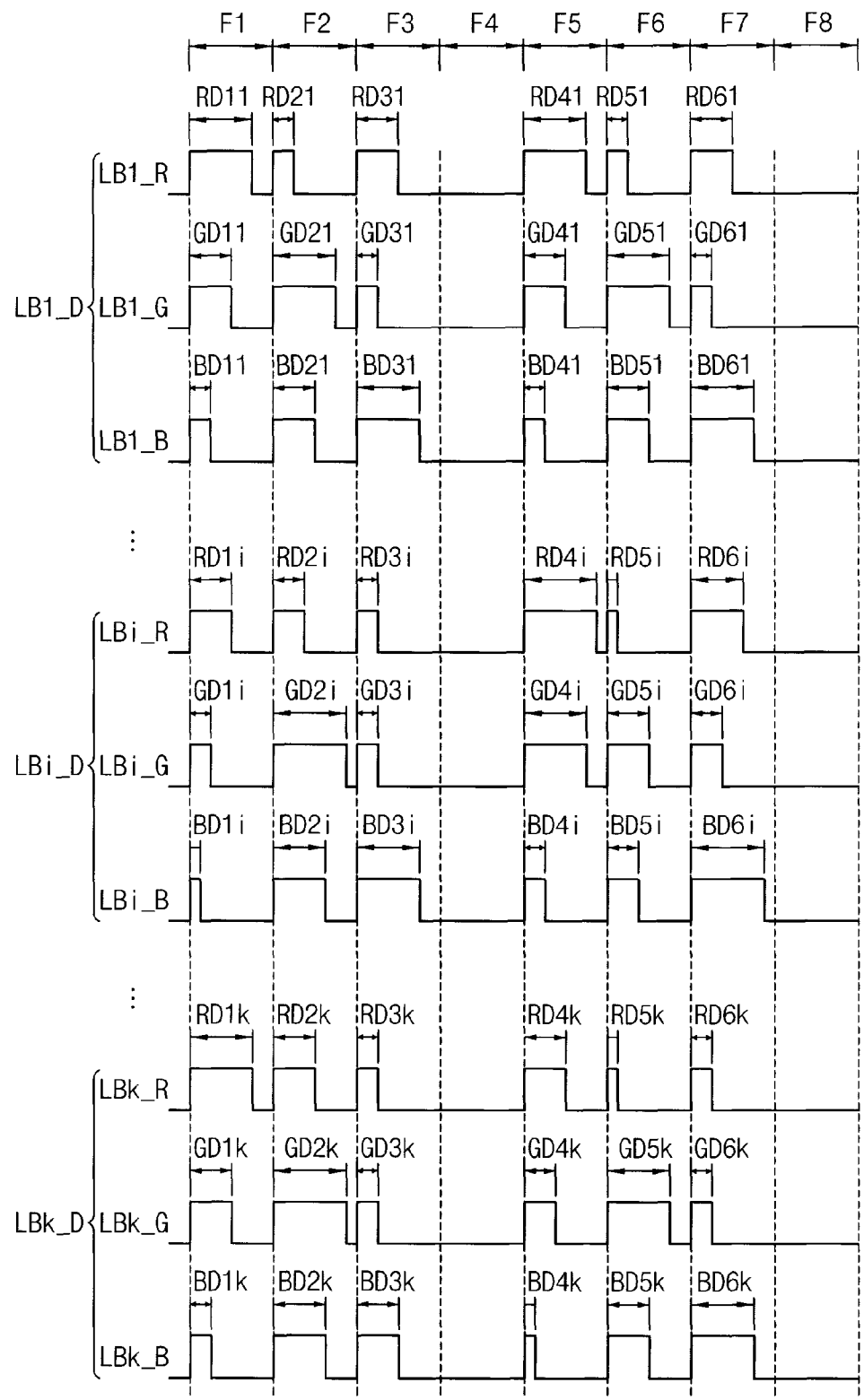
FIG. 7 is a signal timing diagrams illustrating output signals of an exemplary embodiment of a light source driving part of FIG. 1.

FIG. 7 is a signal timing diagram illustrating output signals of an exemplary embodiment of a light source driving part in FIG. 1.

Hereinafter, an exemplary embodiment of a method of driving the light source part in the 3D image mode will be described referring to FIGS. 1, 5 and 7.

The dimming level calculation part 361 calculates first, second and third virtual primary color dimming levels of the light-emitting block corresponding to each of the display blocks using first, second and third virtual primary color data corresponding to each of the display blocks received from the virtual primary decision part 350. The dimming level may be a duty ratio of a pulse width modulation ("PWM") signal.

In one exemplary embodiment, for example, the dimming level calculation part 361 calculates first left-eye virtual primary dimming levels RD11, GD11 and BD11 of red, green and blue light sources included in a first light-emitting block LB1, based on a first left-eye virtual primary color data R1 of a first display block DB1. Similarly, the dimming level calculation part 360 calculates i-th left-eye virtual primary dimming levels RD1i, GD1i and BD1i of red, green and blue light sources included in an i-th light-emitting block LBi, based on an i-th left-eye virtual primary color data Ri of an i-th display block DBi, and calculates k-th left-eye virtual primary dimming levels RD1k, GD1k and BD1k of red, green and blue light sources included in a k-th light-emitting block LBk, based on an k-th left-eye virtual primary color data Rk of an k-th display block DBk.

In such an embodiment, the light source driving part 220 generates first to k-th driving signals LB1_D, . . . , LBiD, . . . , LBk_D respectively corresponding to the light-emitting blocks LB1, . . . , LBi, . . . , LBk based on the first left-eye virtual primary color dimming levels respectively corresponding to the light-emitting blocks LB1, . . . , LBi, . . . , LBk received from the dimming level calculation part 361. Each of the driving signals LB1_D, . . . , LBi_D, . . . , LBk_D may includes driving signals of the color light sources included in the light-emitting block. In one exemplary embodiment, for example, when the first light-emitting block LB1 includes red, green, blue light sources, the first driving signal LB1_D may include red, green and blue driving signals LB1_R, LB1_G, LB1_B.

As shown in FIG. 7, during the first field F1, the first driving signals LB1_D includes pulses which have pulses widths respectively corresponding to the first left-eye virtual primary color dimming levels RD11, GD11 and BD11 of the first light-emitting block LB1, the i-th driving signal LBi_D includes pulses which have pulses widths respectively corresponding to the i-th left-eye virtual primary color dimming levels RD1i, GD1i and BD1i of the i-th light-emitting block LBi, and the k-th driving signal LBk_D includes pulses which have pulses widths respectively corresponding to the k-th left-eye virtual primary color dimming levels RD1k, GD1k and BD1k of the k-th light-emitting block LBk. The light-emitting blocks LB1, . . . , LBi, . . . , LBk may emit a first left-eye virtual primary color light, such as a reddish light, during the first field F1.

Then, the dimming level calculation part 361 calculates second left-eye virtual primary color dimming levels RD21, GD21, BD21, . . . , RD2i, GD2i, BD2i, . . . , RD2k, GD2k, BD2k respectively corresponding to the display blocks DB1, . . . , DBi, . . . , DBk based on the second left-eye virtual primary color data G1, . . . , Gi, . . . , Gk respectively corresponding to the display blocks DB1, . . . , DBi, . . . , DBk. Therefore, the light source driving part 220 generates the first to k-th driving signals LB1_D, . . . , LBi_D, . . . , LBk_D including pulses which have pulse widths respectively corresponding to the second left-eye virtual primary color dimming levels RD21, GD21, BD21, . . . , RD2i, GD2i, BD2i, . . . , RD2k, GD2k, BD2k during the second field F2. The light-emitting blocks LB1, . . . , LBi, . . . , LBk may emit a second left-eye virtual primary color light, such as a greenish light, during the second field F2.

Then, the dimming level calculation part 361 calculates third left-eye virtual primary color dimming levels RD31, GD31, BD31, . . . , RD3i, GD3i, BD3i, . . . , RD3k, GD3k, BD3k respectively corresponding to the display blocks DB1, . . . , DBi, . . . , DBk based on the third left-eye virtual primary color data B1, . . . , Bi, . . . , Bk respectively corresponding to the display blocks DB1, . . . , DBi, . . . , DBk. Therefore, the light source driving part 220 generates the first to k-th driving signals LB1_D, . . . , LBi_D, . . . , LBk_D including pulses which have pulse widths respectively corresponding to the third left-eye virtual primary color dimming levels RD31, GD31, BD31, . . . , RD3i, GD3i, BD3i, . . . , RD3k, GD3k, BD3k during the third field F3. The light-emitting blocks LB1, . . . , LBi, . . . , LBk may emit a third left-eye virtual primary color light, such as a bluish light, during the third field F3.

Then, based on a control of the black insertion part 370, the light source driving part 220 generates the first to k-th driving signals LB1_D, . . . , LBi_D, . . . , LBk_D respectively having an off level to turn off the light-emitting blocks LB1, . . . , LBi, . . . , LBk during a fourth field F4. The light-emitting blocks LB1, . . . , LBi, . . . , LBk does not emit light during the fourth field F4.

Then, the dimming level calculation part 361 calculates first right-eye virtual primary color dimming levels RD41, GD41, BD41, . . . , RD4i, GD4i, BD4i, . . . , RD4k, GD4k, BD4k respectively corresponding to the display blocks DB1, ..., DBi, ..., DBk based on the first right-eye virtual primary color data R1, ..., Ri, ..., Rk respectively corresponding to the light-emitting blocks. Therefore, the light source driving part 220 generates the first to k-th driving signals LB1_D, ..., LBi_D, ..., LBk_D including pulses which have pulse widths respectively corresponding to the first right-eye virtual primary color dimming levels RD41, GD41, BD41, ..., RD4i, GD4i, BD4i, ..., RD4k, GD4k, BD4k during a fifth field F5. The light-emitting blocks LB1, ..., LBi, ..., LBk may emit the first right-eye virtual primary color light, such as the reddish light, during the fifth field F5.

Then, the dimming level calculation part 361 calculates second right-eye virtual primary color dimming levels RD51, GD51, BD51, ..., RD5i, GD5i, BD5i, ..., RD5k, GD5k, BD5k respectively corresponding to the display block DB1, ..., DBi, ..., DBk based on the second right-eye virtual primary color data G1, ..., Gi, ..., Gk respectively corresponding to the light-emitting blocks LB1, ..., LBi, ..., LBk. Therefore, the light source driving part 220 generates the first to k-th driving signals LB1_D, ..., LBi_D, ..., LBk_D including pulses which have pulse widths respectively corresponding to the second right-eye virtual primary color dimming levels RD51, GD51, BD51, ..., RD5i, GD5i, BD5i, ..., RD5k, GD5k, BD5k during a sixth field F6. The light-emitting blocks LB1, ..., LBi, ..., LBk may emit a second right-eye virtual primary color light, such as the greenish light, during the sixth field F6.

Then, the dimming level calculation part 361 calculates third right-eye virtual primary color dimming levels RD61, GD61, BD61, ..., RD6i, GD6i, BD6i, ..., RD6k, GD6k, BD6k respectively corresponding to the display blocks DB1, ..., DBi, ..., DBk based on the third right-eye virtual primary color data B1, ..., Bi, ..., Bk respectively corresponding to the light-emitting blocks LB1, ..., LBi, ..., LBk. Therefore, the light source driving part 220 generates first to k-th driving signals LB1_D, ..., LBi_D, ..., LBk_D including pulses which have pulse widths respectively corresponding to the third right-eye virtual primary color dimming levels RD61, GD61, BD61, ..., RD6i, GD6i, BD6i, ..., RD6k, GD6k, BD6k during a seventh field F7. The light-emitting blocks LB1, ..., LBi, ..., LBk may emit a third right-eye virtual primary color light, such as the bluish light, during the seventh field F7.

Then, based on a control of the black insertion part 370, the light source driving part 220 generates the first to k-th driving signals LB1_D, ..., LBi_D, ..., LBk_D respectively having the off level to turn off the light-emitting blocks LB1, ..., LBi, ..., LBk during an eighth field F8. The light-emitting blocks LB1, ..., LBi, ..., LBk does not emit light during the eighth field F8.

Figure 8A:
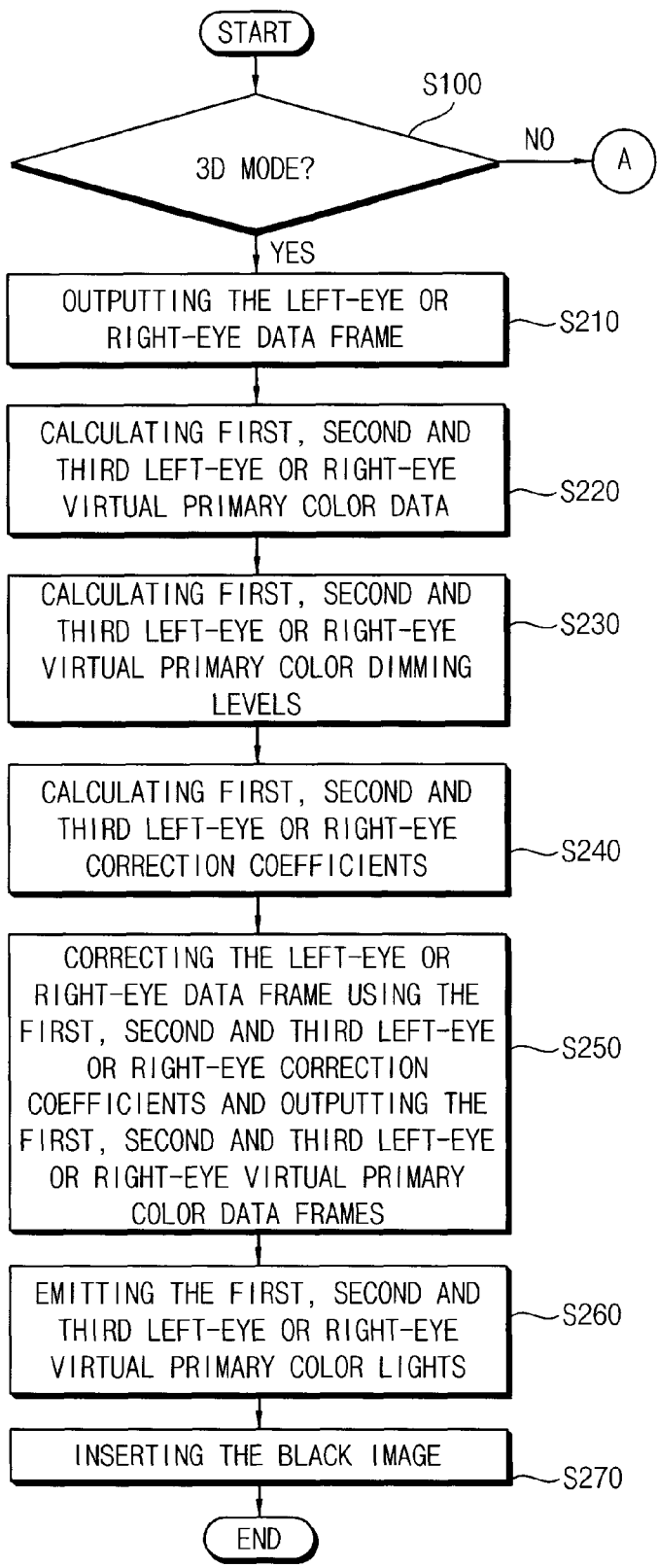
FIGS. 8A and 8B are flowcharts illustrating an exemplary embodiment of a method of displaying an image in the display apparatus of FIG. 1.
Figure 8B:
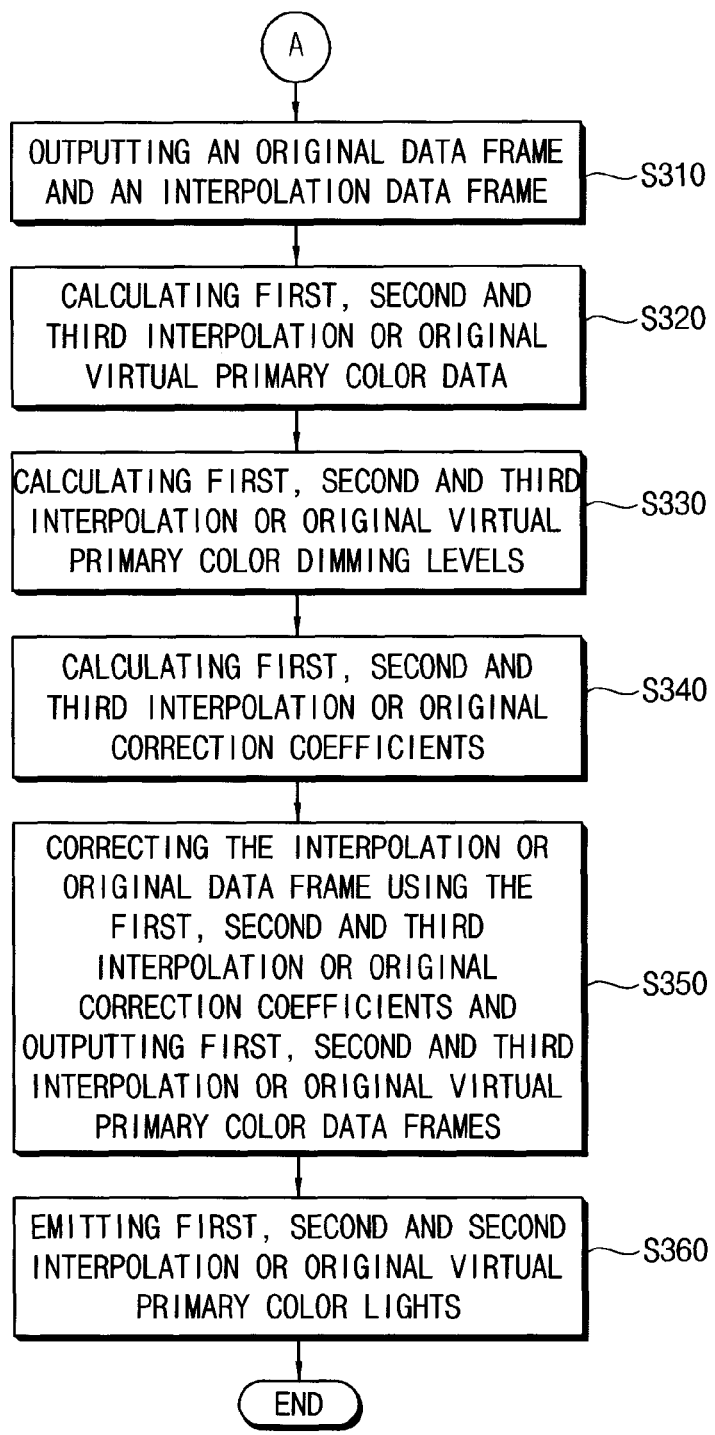
Figure 9:
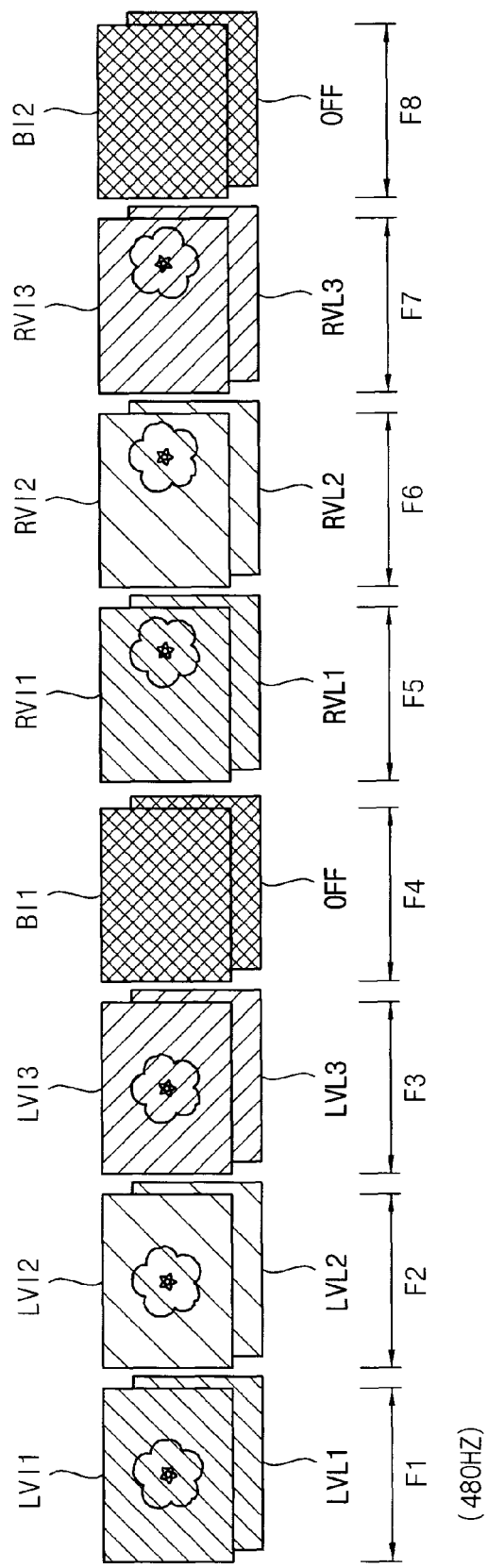
FIG. 9 is a schematic diagram illustrating an exemplary embodiment of the method of displaying the image in a 3D image mode in FIG. 8A.
Figure 10:
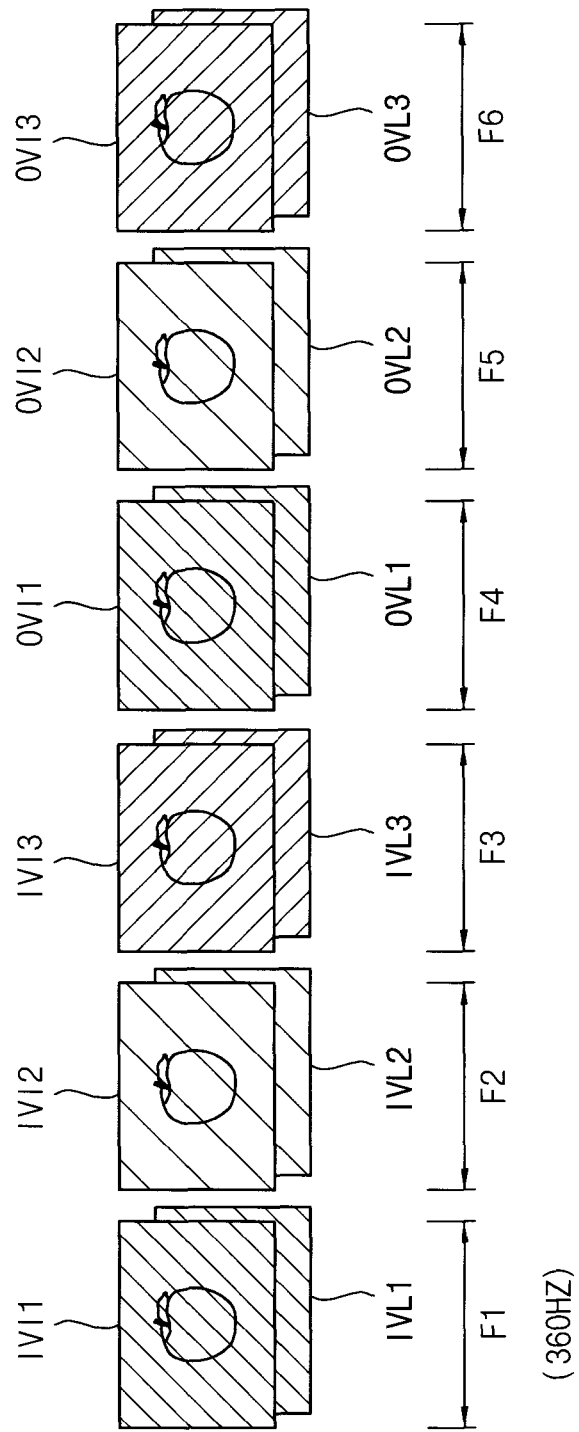
FIG. 10 is a schematic diagram illustrating an exemplary embodiment of the method of displaying the image in a 2D image mode in FIG. 8B.

FIGS. 8A and 8B are flowcharts illustrating an exemplary embodiment of a method of displaying an image in the display apparatus in FIG. 1. FIG. 9 is a schematic diagram illustrating the method of displaying the image in the 3D image mode shown in FIG. 8A. FIG. 10 is a schematic diagram illustrating the method of displaying the image in a 2D image mode shown in FIG. 8B.

Referring to FIGS. 1 and 8A, the mode decision part 310 decides whether the received image signal is an image signal for the 2D image mode or for the 3D image mode (step S100).

In the 3D image mode, a 3D image processing part 320 processes the 3D original data frame to sequentially output a left-eye data frame and a right-eye data frame (step S210).

The data processing part 340 maps red, green and blue data of the left-eye or right-eye data frame into red, green, blue and at least one primary color data. The virtual primary decision part 350 calculates first, second and third left-eye or right-eye virtual primary color data corresponding to each of the display blocks using the mapped left-eye or right-eye data frame (step S220).

The dimming level decision part 360 calculates first, second and third left-eye or right-eye virtual primary color dimming levels corresponding to each of the display blocks using the first, second and third left-eye or right-eye virtual primary color data (step S230).

The dimming level decision part 360 calculates first, second and third left-eye or right-eye correction coefficients using the first, second and third left-eye or right-eye virtual primary color dimming levels (step S240).

The data processing part 340 corrects the left-eye or right-eye data frame using the first, second and third left-eye or right-eye correction coefficients. Therefore, the data processing part 340 outputs first, second and third left-eye or right-eye virtual primary color data frames to the black insertion part 370. The black insertion part 370 sequentially outputs the first, second and third left-eye or right-eye virtual primary color data frames to the panel driving part 120 during three consecutive fields (step S250).

The dimming level decision part 360 outputs the first, second and third left-eye or right-eye virtual primary color dimming levels to the black insertion part 370. The black insertion part 370 sequentially outputs the first, second and third left-eye or right-eye virtual primary color dimming levels to the light source driving part 220 during the three consecutive fields.

The light source driving part 220 generates driving signals respectively corresponding to the light-emitting blocks based on the first, second and third left-eye or right-eye virtual primary color dimming levels. The light-emitting blocks of the light source part 210 sequentially emits the first, second and third left-eye or right-eye virtual primary color lights in response to the driving signals during the three consecutive fields (step S260).

In an exemplary embodiment, after the black insertion part 370 outputs the first, second and third left-eye or right-eye virtual primary color data frames to the panel driving part 120 during the three consecutive fields, and controls the panel driving part 120 such that the panel driving part 120 output black data to the display panel 110 during a subsequent field. In an exemplary embodiment, after the black insertion part 370 outputs the first, second and third left-eye or right-eye virtual primary color dimming levels to the light source driving part 220 during the three fields, and controls the light source driving part 220 such that the light source driving part 220 turns off the light source part 210 during a subsequent field (step S270).

In such an embodiment, the display apparatus may display the first, second and third left-eye virtual primary color images during the three consecutive fields and may display the black image during the subsequent field of the three consecutive fields, and the display apparatus may display the first, second and third right-eye virtual primary color images during three consecutive fields after the subsequent field and may display the black image during one field after the three consecutive fields after the subsequent field.

Referring to FIG. 9, in an exemplary embodiment, the panel module 100 displays a first left-eye virtual primary color image LVI1, such as a reddish left-eye image, during the first field F1, displays a second left-eye virtual primary color image LVI2, such as a greenish left-eye image, during the second field F2, displays a third left-eye virtual primary color image LVI3, such as a bluish left-eye image, during the third field F3, displays a first black image BI1 during a fourth field F4, displays a first right-eye virtual primary color image RVI1, such as a reddish right-eye image, during the fifth field F5, displays a second right-eye virtual primary color image RVI2, such as a greenish right-eye image, during the sixth field F6, and displays a third right-eye virtual primary color image RVI3, such as a bluish right-eye image, during the seventh field F7, and displays a second black BI2 image during an eighth field F8.

In an exemplary embodiment, the light source module 200 emits a first left-eye virtual primary color light LVL1, such as a reddish left-eye light during the first field F1, emits a second left-eye virtual primary color light LVL2, such as a greenish left-eye light during the second field F2, emits a third left-eye virtual primary color light LVL3, such as a bluish left-eye light during the third field F3, does not emit the light during the fourth field F4 OFF, emits a first right-eye virtual primary color light RVL1, such as a reddish right-eye light during the fifth field F5, emits a second right-eye virtual primary color light RVL2, such as a greenish right-eye light during the sixth field F6, emits a third right-eye virtual primary color light RVL3, such as a bluish right-eye light during the seventh field F7, and does not emit the light during the eighth field F8 OFF.

In such an embodiment, the display apparatus displays a reddish left-eye image during the first field F1, displays a greenish left-eye image during the second field F2, displays a bluish left-eye image during the third field F3, display a black image during the fourth field F4, displays a reddish right-eye image during the fifth field F5, displays a greenish right-eye image during the sixth field F6, displays a bluish right-eye image during the seventh field F7 and display the black image during the eighth field F8. In one exemplary embodiment, for example, each field may be driven with a frequency of 480 hertz (Hz) in the 3D image mode.

In an exemplary embodiment, a color light difference between adjacent fields substantially decreases using a plurality of virtual primary color lights such that a color break-up is effectively prevented in a field sequential color ("FSC") driving mode. In such an embodiment, a crosstalk of the 3D stereoscopic image is substantially improved by inserting the black image between the left-eye image and the right-eye image.

Referring to FIGS. 1 and 8B, in the 2D image mode, the 2D image processing part 330 sequentially outputs original data frame received from the mode decision part 310 and an interpolation data frame interpolated from the original data frame using the MEMC algorithm (step S310). In an exemplary embodiment, the 2D image processing part 330 may repeatedly receive the original data frame to sequentially output a first original data frame and a second original data frame. A method of driving in the 2D image mode is similar to that in the 3D image mode described above, and thus the description thereof will be simplified.

The data processing part 340 maps red, green and blue data of the interpolation or original data frame into red, green, blue and at least one primary color data. The virtual primary decision part 350 calculates first, second and third interpolation or original virtual primary color data corresponding to each of the display blocks using the mapped interpolation or original data frame (step S320).

The dimming level decision part 360 calculates first, second and third interpolation or original virtual primary color dimming levels respectively corresponding to the light-emitting blocks using the first, second and third interpolation or original virtual primary color data (step S330).

The dimming level decision part 360 calculates first, second and third interpolation or original correction coefficients using the first, second and third interpolation or original virtual primary color dimming levels (step S340).

The data processing part 340 corrects the interpolation or original data frame using the first, second and third interpolation or original correction coefficients. Therefore, the data processing part 340 sequentially outputs first, second and third interpolation or original virtual primary color data frames to the panel driving part 120 during three consecutive fields (step S350).

The dimming level decision part 360 sequentially outputs the first, second and third interpolation or original virtual primary color dimming levels to the light source driving part 220 during the three consecutive fields.

The light source driving part 220 generates driving signals respectively corresponding to the light-emitting blocks based on the first, second and third interpolation or original virtual primary color dimming levels. The light-emitting blocks of the light source part 210 sequentially emits first, second and second interpolation or original virtual primary color lights in response to the driving signals during the three consecutive fields (step S360).

In such an embodiment, the display apparatus may display the first, second and third interpolation virtual primary color images during the three consecutive fields, and may continuously display the first, second and third original virtual primary color images during the three consecutive fields.

Referring to FIG. 10, the panel module 100 displays a first interpolation virtual primary color image IVI1, such as a reddish interpolation image during the first field F1, displays a second interpolation virtual primary color image IVI2, such as a greenish interpolation image, during the second field F2, displays a third interpolation virtual primary color image IVI3, such as a bluish interpolation image, during the third field F3, displays a first original virtual primary color image OVI1, such as a reddish original, image during the fourth field F4, displays a fifth original virtual primary color image OVI2, such as a greenish original image, during the fifth field F5, and displays a third original virtual primary color image OVI3, such as a bluish original image, during the sixth field F6.

The light source module 200 emits a first interpolation virtual primary color light IVL1, such as a reddish interpolation light, during the first field F1, emits a second interpolation virtual primary color light IVL2, such as a greenish interpolation light, during the second field F2, emits a third interpolation virtual primary color light IVL3, such as a bluish interpolation light, during the third field F3, emits a first original virtual primary color light OVL1, such as a reddish original light, during the fourth field F4, emits a second original virtual primary color light OVL2, such as a greenish original light, during the fifth field F5, and emits a third original virtual primary color light OVL3, such as a bluish original light, during the sixth field F6.

In such an embodiment, the display apparatus displays a reddish interpolation image during the first field F1, displays a greenish interpolation image during the second field F2, displays a bluish interpolation image during the third field F3, displays a reddish original image during the fourth field F4, displays a greenish original image during the fifth field F5, and displays a bluish original image during the sixth field F6. In one exemplary embodiment, for example, each field may be driven with the frequency of 360 Hz in the 2D image mode.

In such an embodiment, a color light difference between adjacent fields substantially decreases using a plurality of virtual primary color lights such that the color break-up is effectively prevented in the FSC driving mode.

According to an exemplary embodiment of the display apparatus including multi-primary color sub pixel, virtual primary color lights are sequentially provided to the display panel including multi-primary color sub pixels on a field-by-field basis such that the color break-up is substantially improved. In such an embodiment, the 2D image and the 3D image may be displayed by the FSC mode using the virtual primary color lights.

Figure 11:
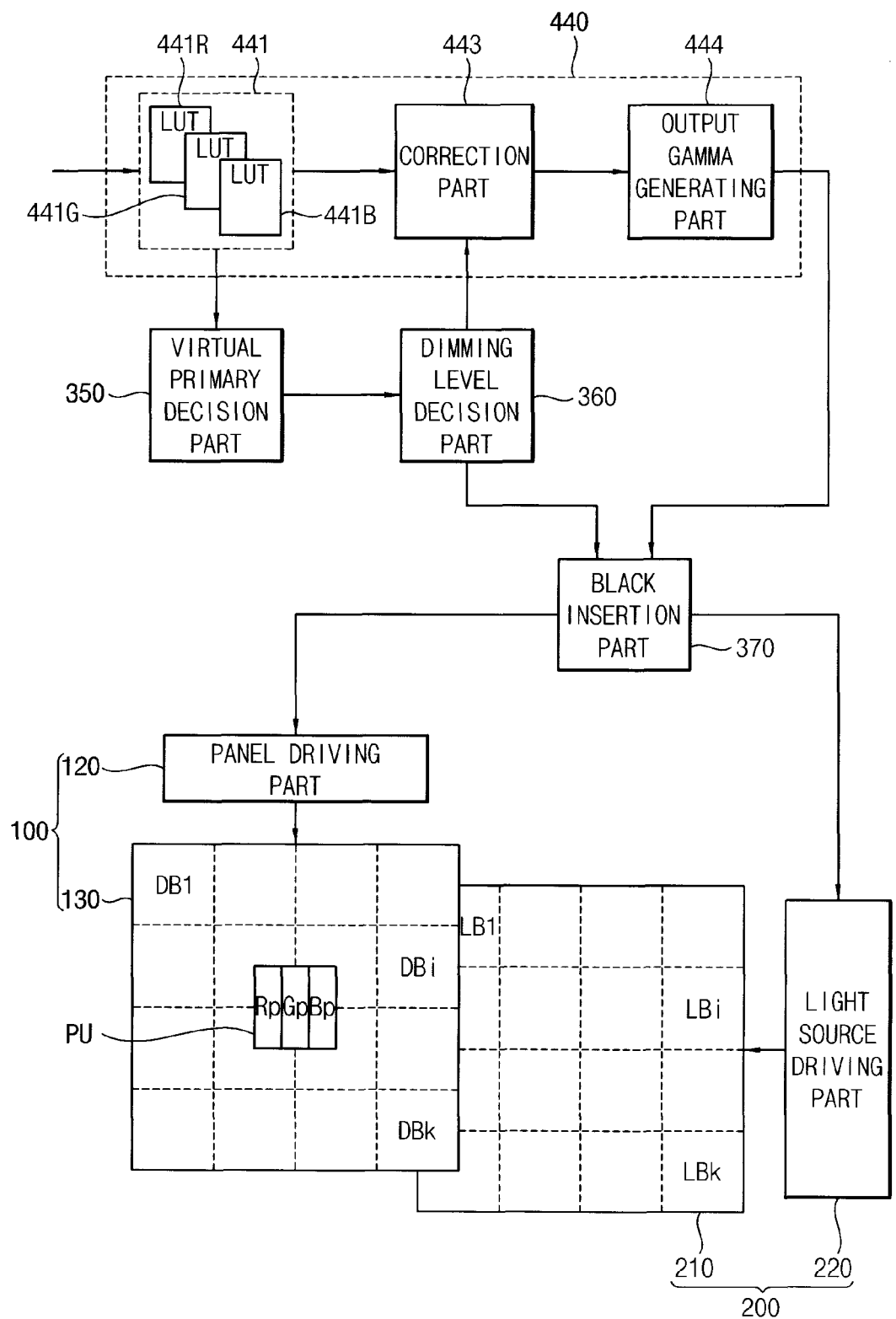
FIG. 11 is a block diagram illustrating an alternative exemplary embodiment of a display apparatus according to the invention.

FIG. 11 is a block diagram illustrating an alternative exemplary embodiment of a display apparatus according to the invention.

The display apparatus in FIG. 11 is substantially the same as the display apparatus shown in FIG. 1 expect for the display panel and the data processing part. The same or like elements shown in FIG. 11 have been labeled with the same reference characters as used above to describe the exemplary embodiments of the display apparatus shown in FIG. 1, and any repetitive detailed explanation thereof will hereinafter be omitted or simplified.

Referring to FIGS. 1 and 11, the display apparatus includes a panel module 100, a light source module 200 and a data processing module 300.

The panel module 100 includes a display panel 130 and a panel driving part 120. The light source module 200 includes a light source part 210 and light source driving part 220. The data processing module 300 includes a mode decision part 310, a 3D image processing part 320, a 2D image processing part 330, a data processing part 440, a virtual primary decision part 350, a dimming level decision part 360 and a black insertion part 370.

The display panel 130 includes a plurality of unit pixels, and each of the unit pixels PU includes red, green and blue sub pixels Rp, Gp and Bp.

The data processing part 440 includes an input gamma generating part 441, a correction part 443 and an output gamma generating part 444.

The input gamma generating part 441 extends received red data of n bits, received green data of n bits and received blue data of n bits using the red, green and blue LUTs 441R, 441G and 441B to output a data frame including red data of m bits, green data of m bits and blue data of m bits. The input gamma generating part 441 provides the data frame to the correction part 443 and the virtual primary color decision part 350.

The correction part 443 corrects the data frame based on first, second and third correction coefficient 360a received from the dimming level decision part 360 to output a first virtual primary color data frame, a second virtual primary color data frame and a third virtual primary color data frame on a field-by-field basis.

The output gamma generating part 444 reduces the red, green and blue data of m bits which are color data including each of the first, second and third virtual primary color data frames, into the red, green and blue data of n bits, which are original bits.

In the exemplary embodiment shown in FIG. 11, the virtual primary decision part 350, the dimming level decision part 360 and the black insertion part 370 are driven based on the data frame received from the data processing part 440 in substantially the same method as the exemplary embodiment shown in FIG. 1.

In one exemplary embodiment, for example, as described in FIGS. 3 and 4, the virtual primary decision part 350 decides a plurality of virtual primary colors corresponding to a block image displayed on each of the display blocks. The plurality of virtual primary colors may include a first virtual primary color, such as a reddish color, a second virtual primary color, such as a greenish color and a third virtual primary color, such as a bluish color. The virtual primary decision part 350 outputs data of the decided first, second and third virtual primary colors corresponding to each of the display blocks to the dimming level decision part 360.

As described in FIG. 5, the dimming level decision part 360 decides first, second and third virtual primary color dimming levels respectively corresponding to light-emitting blocks using the data of the first, second and third virtual primary colors. The dimming level decision part 360 provides the first, second and third virtual primary color dimming levels to the light source driving part 220.

In such an embodiment, the dimming level decision part 360 analyses a luminance distribution corresponding to a first virtual primary color light emitted from the light-emitting blocks LB1, ..., LBi, ..., LBk based on the first virtual primary color dimming levels respectively corresponding to the light-emitting blocks LB1, ..., LBi, ..., LBk. The dimming level decision part 360 calculates a first correction coefficient to correct a pixel luminance corresponding to each of sub pixels based on the luminance distribution of the first virtual primary color light. Similarly, the dimming level decision part 360 calculates a second correction coefficient and a third correction coefficient. The dimming level decision part 360 provides the first, second and third correction coefficients to the data processing part 340 on a field-by-field basis.

As described in FIGS. 6A and 6B, in the 2D and 3D image modes, the data processing part 440 corrects the data frame using the first correction coefficient to output the first virtual primary color data frame during the first field, corrects the data frame using the second correction coefficient to output the second virtual primary color data frame during the second field, and corrects the data frame using the third correction coefficient to output the third virtual primary color data frame during the third field.

The black insertion part 370 may control at least one of the panel driving part 120 and the light source driving part 220 to insert a black image between a left-eye image and a right-eye image to prevent a crosstalk in the 3D image mode. In the 2D image mode, the black insertion part 370 does not substantially operate. The black insertion part 370 bypasses signals received from the data processing part 440 and the dimming level decision part 360 to the panel driving part 120 and the light source driving part 220.

In an alternative exemplary embodiment, the unit pixel PU of the display panel may not include a color filter, in other words, the unit pixel PU include white (or clear) sub pixels only (not shown). When the display panel includes the white sub pixels only, a method of displaying an image may be substantially the same as the method described in FIG. 11.

According to the exemplary embodiments set forth herein, a color light difference between adjacent fields substantially decreases using a plurality of virtual primary color lights such that a color break-up is effectively prevented in the FSC driving mode, and a crosstalk of the 3D stereoscopic image is substantially improved by inserting the black image between the left-eye image and the right-eye image.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A method of displaying a three-dimensional stereoscopic image, the method comprising:
    mapping received red, green and blue data into red, green, blue and at least one primary color data corresponding to the sub pixels of a display panel;
    generating a left-eye data frame including the red, green, blue and at least one primary color data for a left-eye or a right-eye data frame including the red, green, blue and at least one primary color data for a right-eye;
    generating a plurality of left-eye reddish, greenish and bluish data, which respectively correspond to red, green and blue peak values of a color distribution of a predetermined display block of a plurality of display blocks, using the left-eye data frame or a plurality of right-eye reddish, greenish and bluish data, which respectively correspond to red, green and blue peak values of a color distribution of a predetermined display block of the plurality of display blocks, using the right-eye data frame;
    calculating a plurality of left-eye reddish, greenish and bluish dimming levels using the left-eye reddish, greenish and bluish data or a plurality of right-eye reddish, greenish and bluish dimming levels using the right-eye reddish, greenish and bluish data;
    calculating a plurality of left-eye correction coefficients using the plurality of left-eye reddish, greenish and bluish dimming levels or a plurality of right-eye correction coefficients using the plurality of right-eye reddish, greenish and bluish dimming levels;
    sequentially outputting a plurality of left-eye reddish, greenish and bluish data frames corrected based on the plurality of left-eye correction coefficients or a plurality of right-eye reddish, greenish and bluish data frames corrected based on the plurality of right-eye correction coefficients, to a display panel; and
    sequentially providing a plurality of left-eye reddish, greenish and bluish lights generated from a light source based on the left-eye reddish, greenish and bluish dimming levels to the display panel or a plurality of right-eye reddish, greenish and bluish lights generated from a light source part based on the right-eye reddish, greenish and bluish dimming levels, to the display panel.

2. The method of claim 1, wherein the light source part comprises a plurality of light-emitting blocks which is driven independent of each other, and the left-eye reddish, greenish and bluish data or the right-eye reddish, greenish and bluish data are generated corresponding to each of the light-emitting blocks.

3. The method of claim 1, wherein the left-eye reddish, greenish and bluish data or the right-eye reddish, greenish and bluish data include reddish color data, greenish color data and bluish color data.

4. The method of claim 1, wherein the sequentially outputting the left-eye reddish, greenish and bluish data frames or the right-eye reddish, greenish and bluish data frames to the display panel comprises:
    calculating a plurality of correction coefficients using the left-eye reddish, greenish and bluish dimming levels or the right-eye reddish, greenish and bluish dimming levels; and
    correcting the left-eye data frame or the right-eye data frame using the correction coefficients.

5. The method of claim 1, wherein the sequentially outputting the left-eye reddish, greenish and bluish data frames or the right-eye reddish, greenish and bluish data frames to the display panel comprises:
    correcting the mapped left-eye data frame or the mapped right-eye data frame using the correction coefficients.

6. The method of claim 1, further comprising:
    displaying a black image on the display panel, after the sequentially outputting the left-eye reddish, greenish and bluish data frames or the right-eye reddish, greenish and bluish data frames to the display panel.

7. The method of claim 6, wherein the displaying the black image on the display panel comprises:
    outputting black data corresponding to the black image to the display panel; and
    turning off the light source part such that light generated therefrom is blocked from reaching the display panel.

8. The method of claim 6, wherein the displaying the black image on the display panel comprises:
    outputting black data corresponding to the black image to the display panel.

9. The method of claim 6, wherein the displaying the black image on the display panel comprises:
    turning off the light source part such that light generated therefrom is blocked from reaching the display panel.

10. The method of claim 1, wherein the generating the left-eye reddish, greenish and bluish data or the right-eye reddish, greenish and bluish comprises:
    detecting a color distribution for the left-eye using the left-eye data frame including the red, green, blue and at least one primary color data for the left-eye;
    calculating the left-eye reddish, greenish and bluish data corresponding to the color distribution for the left-eye;
    detecting a color distribution for the right-eye using the right-eye data frame including the red, green, blue and at least one primary color data for the right-eye; and
    calculating the right-eye reddish, greenish and bluish data corresponding to the color distribution for the right-eye.

11. A display apparatus comprising:
    a display panel comprising a red, green, blue and at least one primary color sub pixels;
    a data processor which receives red, green and blue data, and maps the received red, green and blue data into red, green, blue and at least one primary color data corresponding to the sub pixels of the display panel, wherein the data processor generates a left-eye data frame including the red, green, blue and at least one primary color data for a left-eye or a right-eye data frame including the red, green, blue and at least one primary color data for a right-eye, generates a plurality of left-eye reddish, greenish and bluish data, which respectively correspond to red, green and blue peak values of a color distribution of a predetermined display block of a plurality of display blocks, using the left-eye data frame or a plurality of right-eye reddish, greenish and bluish data, which respectively correspond to red, green and blue peak values of a color distribution of a predetermined display block of the plurality of display blocks, using the right-eye data frame, calculates a plurality of left-eye reddish, greenish and bluish dimming levels using the left-eye reddish, greenish and bluish data or a plurality of right-eye reddish, greenish and bluish dimming levels using the right-eye reddish, greenish and bluish data, and calculates a plurality of left-eye correction coefficients using the plurality of left-eye reddish, greenish and bluish dimming levels or a plurality of right-eye correction coefficients using the plurality of right-eye reddish, greenish and bluish dimming levels; and a light source which generates a plurality of left-eye reddish, greenish and bluish lights based on the left-eye reddish, greenish and bluish dimming levels or a plurality of right-eye reddish, greenish and bluish lights based on the right-eye reddish, greenish and bluish dimming levels, wherein the data processor generates a plurality of left-eye reddish, greenish and bluish data frames corrected based on the plurality of left-eye correction coefficients or a plurality of right-eye virtual primary red, green and blue frames corrected based on the plurality of right-eye correction coefficients, the display panel sequentially displays a plurality of left-eye reddish, greenish and bluish images or a plurality of right-eye reddish, greenish and bluish images respectively corresponding to the plurality of left-eye reddish, greenish and bluish data frames or the plurality of right-eye reddish, greenish and bluish data frames, and the light source sequentially provides the display panel sequentially displaying the plurality of left-eye reddish, greenish and bluish images with the plurality of left-eye reddish, greenish and bluish lights or, sequentially provides the display panel sequentially displaying the plurality of right-eye reddish, greenish and bluish images with the plurality of right-eye reddish, greenish and bluish lights.

12. The display apparatus of claim 11, wherein the light source comprises a plurality of light-emitting blocks which is driven independent of each other, and the data processor generates the left-eye reddish, greenish and bluish data or the right-eye reddish, greenish and bluish data corresponding to each of the light-emitting blocks.

13. The display apparatus of claim 11, wherein the data processor calculates a plurality of correction coefficients using the left-eye reddish, greenish and bluish dimming levels or the right-eye reddish, greenish and bluish dimming levels, and corrects the left-eye data frame or the right-eye data frame using the correction coefficients.

14. The display apparatus of claim 11, wherein the data processor corrects the mapped left-eye data frame or the mapped right-eye data frame using the correction coefficients.

15. The display apparatus of claim 11, wherein the data processor displays a black image on the display panel, after the left-eye reddish, greenish and bluish data frames or the right-eye reddish, greenish and bluish data frames are sequentially outputted to the display panel.

16. The display apparatus of claim 11, wherein the data processor detects a color distribution for the left-eye using the left-eye data frame including the red, green, blue and at least one primary color data for the left-eye, calculates the left-eye reddish, greenish and bluish data corresponding to the color distribution for the left-eye, detects a color distribution for the right-eye using the right-eye data frame including the red, green, blue and at least one primary color data for the right-eye, and calculates the right-eye reddish, greenish and bluish data corresponding to the color distribution for the right-eye.

* * * * *